United States Patent [19]

Ikegaya et al.

[11] Patent Number: 4,969,914
[45] Date of Patent: Nov. 13, 1990

[54] AIRPLANE WINDOW POLISHING DEVICE

[75] Inventors: Toshiaki Ikegaya, Matsudo; Takashi Shirahata, Hachioji; Yasumasa Koyama; Minoru Momose, both of Chino, all of Japan

[73] Assignees: Yachiyo Micro Science Inc.; Sinano Electric Co., Ltd., both of Tokyo, Japan

[21] Appl. No.: 295,295

[22] Filed: Jan. 10, 1989

[30] Foreign Application Priority Data

Jan. 18, 1988 [JP] Japan ................................ 63-6899

[51] Int. Cl.⁵ .......................................... B24B 29/02
[52] U.S. Cl. ................................ 51/241 S; 51/56 R; 51/180
[58] Field of Search ............... 51/56 R, 241 S, 180, 51/177, 174, 170 T, 267, 283 R, 326

[56] References Cited

U.S. PATENT DOCUMENTS

| | | | |
|---|---|---|---|
| 843,624 | 2/1907 | Pierce | 51/267 |
| 1,777,726 | 10/1930 | Inwald | 51/56 |
| 2,507,052 | 5/1950 | Robinson | 51/180 |
| 3,026,653 | 3/1962 | DeZordo | 51/56 |
| 3,701,223 | 10/1972 | Cole | 51/241 S |
| 4,614,063 | 9/1986 | Crivaro et al. | 51/241 S |

Primary Examiner—Robert A. Rose
Attorney, Agent, or Firm—Emmanuel J. Lobato; Robert E. Burns

[57] ABSTRACT

An automatic polishing device is disclosed for automatic smooth polishing of windowpane from the outside of an airplane without the necessity of removing them from the airplane. The device of the present invention is provided with replaceable petal-shaped polishing pads of the same number as a required number of polishing steps such as rough, medium and finish polishing. Each pad is mounted on the exterior wall surface of an airplane and urged against the window surface with substantially constant pressure and is supplied with liquids for polishing and washing from a centrally-disposed opening.

8 Claims, 4 Drawing Sheets

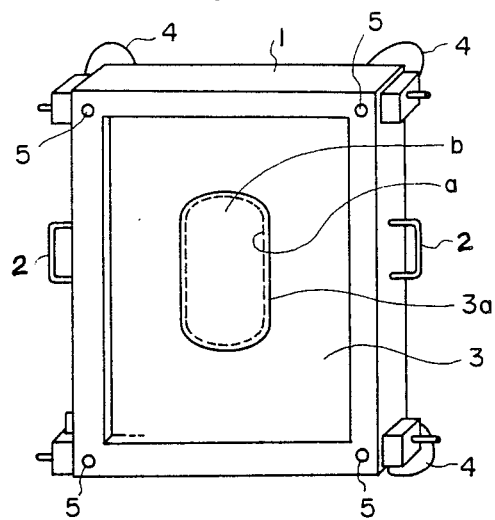
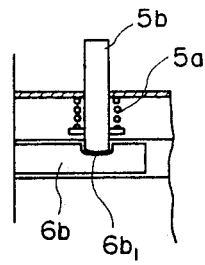
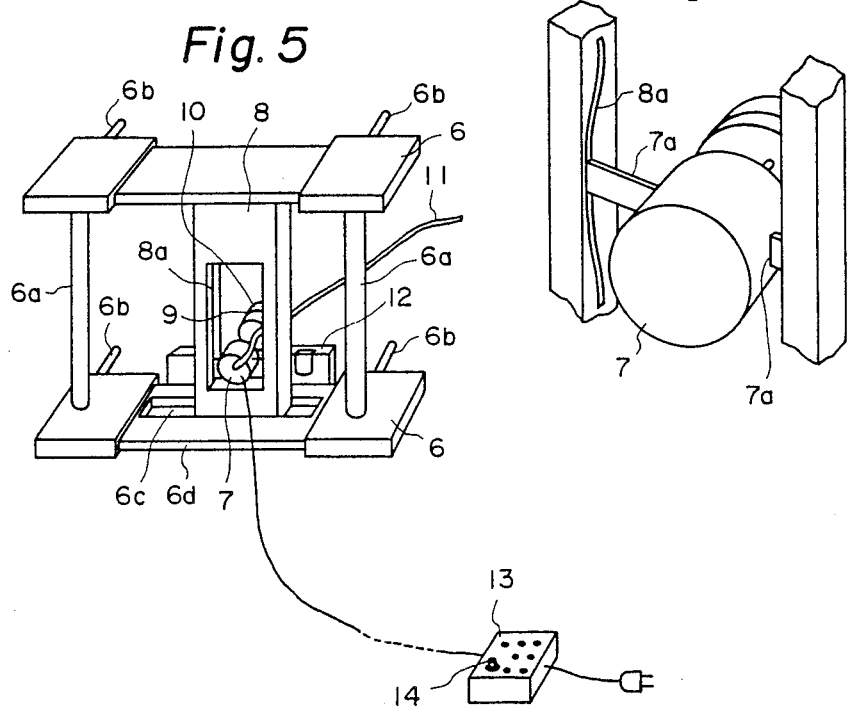

Fig. 8A
Fig. 8B
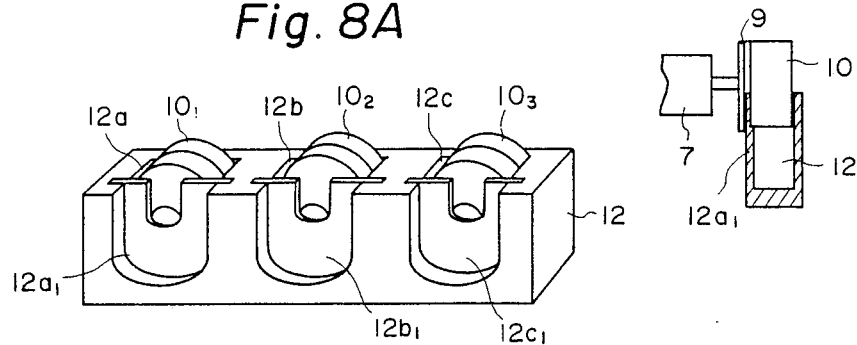
Fig. 9
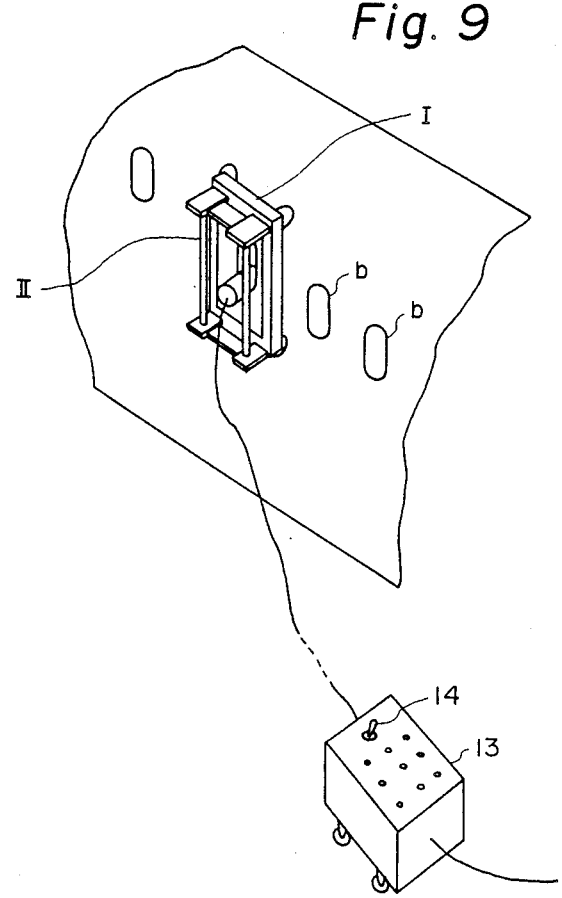

AIRPLANE WINDOW POLISHING DEVICE

BACKGROUND OF THE INVENTION

The present invention relates to a window surface polishing device for aircraft.

For safety's sake, airplane windows are made of difficult-to-break hard glass or hard acrylic resin and double-structured. During high-speed flights, however, the outside window is bombarded with and abraded by fine particles and dust in the air, and hence inevitably suffers from "scratches" and "crevice-like cracks extending into the inside of the windowpane", commonly referred to as crazing, which obstruct the view from the window and give rise to diffuse reflection of sunlight.

It is customary, at present, to polish and smooth window surfaces at regular intervals for customer's satisfaction, but the polishing is done by handwork, for airplane windows are curved unlike those of ordinary buildings and are difficult of automatic polishing. However, airplane windows are not only large in number but also are double-structured as mentioned above and cannot be removed from the outside of the airplane body.

Therefore, the polishing must be done, for instance, in the following steps of: (1) removing seats near each window; (2) removing the inner wall around the window; (3) taking the window frame down and removing the inside windowpane; (4) taking out the outside windowpane; (5) carrying the outside windowpane into a polishing workshop and polishing it by handwork using a motor-driven polisher or the like; and (6) taking the polished windowpane to the plane and fitting it into the window by reversing the procedure (1) to (5) outlined above. However, this method is troublesome and time-consuming, and hence is extremely disadvantageous for the operation of airplanes. In addition, the handwork sometimes causes insufficient finish such as uneven surfaces so that it may shorten the lifetime of the windowpane due to overgrinding or the like. Much skill is required for uniform polishing but causes a marked increase in polishing costs.

SUMMARY OF THE INVENTION

An object of the present invention is to provide an automatic polishing device which is intended to root out the above-mentioned defects of the prior art method and which provides automatic smooth polishing of windowpanes from the outside of an airplane in a far shorter time and with far less labor than handwork, without the necessity of removing them from the airplane.

Briefly stated, the feature of the present invention resides in the following points: The device of the present invention is provided with replaceable petal-shaped polishing pads of the same number as a required number of polishing steps such as rough, medium and finish polishing. Each pad is mounted on the exterior wall surface of an airplane and urged against the window surface with substantially constant pressure and is supplied with liquids for polishing and washing from a centrally-disposed opening.

BRIEF DESCRIPTION OF THE DRAWING

The present invention will be described in detail below with reference to the accompanying drawings:

FIG. 3 is a perspective view of a mounting device;

FIG. 4 is a perspective view showing its principal part on an enlarged scale;

FIG. 5 is a perspective view of a polishing device;

FIG. 6 is an enlarged perspective view of its principal part;

FIGS. 8A and 8B are perspective views of a polishing pad housing box; and

FIG. 9 is a perspective view showing the state of the device during polishing.

DETAILED DESCRIPTION

At first, the principle of the present invention will first be described.

Figure 1A:
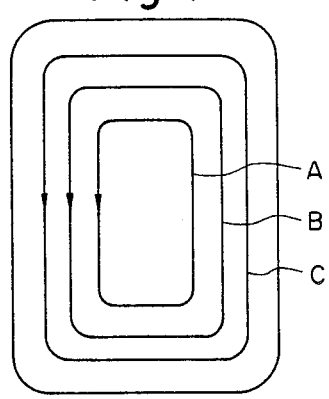
FIGS. 1A and 1B are diagrams showing the ranges of polishing in the present invention.
Figure 1B:
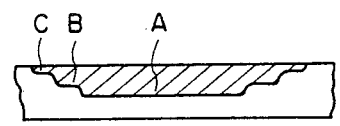
Figure 2A:
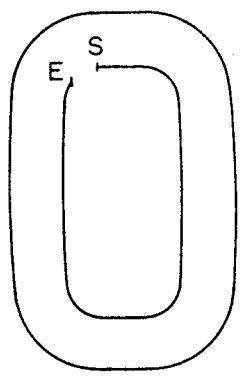
FIGS. 2A, 2B, 2C, 2D and 2E are diagrams illustrating the loci of movements of polishing pads in the present invention.
Figure 2B:
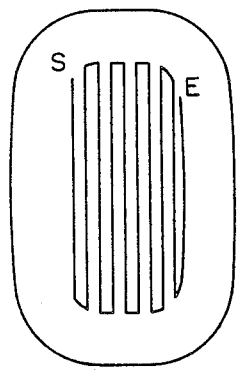
Figure 2C:
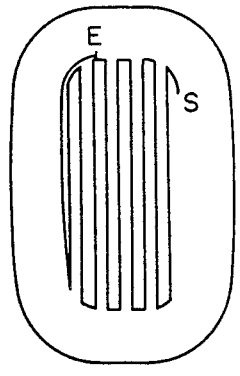
Figure 2D:
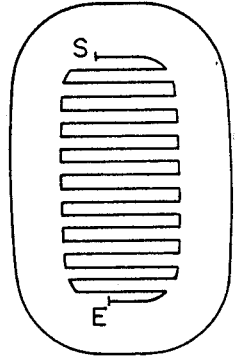
Figure 2E:
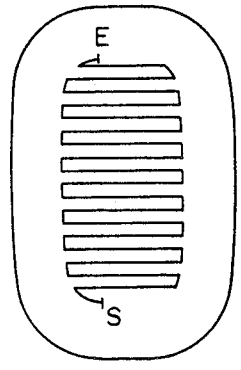

For example, during rough polishing the central area of the windowpane is polished most deeply as indicated by A in FIGS. 1A and 1B; during medium polishing the windowpane is polished over an area wider than that of rough polishing as indicated by B; and during finish polishing the windowpane is polished over the entire area of its surface as indicated by C. In each polishing step, the pad is moved first along such a rectangular path from a start S to an end E as shown in FIG. 2A, then in the Y-axis direction along U-shaped paths as shown in FIG. 2B which is easy of scanning control and free from incomplete scanning of the intended area, then along U-shaped paths shifted by a ½ pitch from those FIG. 2B and reverse in the direction of stroke therefrom as shown in FIG. 2C, then in the X-axis direction along U-shaped paths as shown in FIG. 2D, and then along U-shaped paths shifted by a ½ pitch from those of FIG. 2D and reverse in the direction of stroke therefrom as shown in FIG. 2E. This is intended to attain the following advantages:

A first advantage is to prevent traces of polishing from remaining unremoved after rough, medium and finish polishing, simplify the scanning of the window surface for polishing and ensure complete polishing of the entire area of the window surface through sequential enlargement of the range of polishing by the rough, medium and finish polishing pads, such as shown in FIGS. 1A and 1B, peculiar movements of the polishing pads, such as shown in FIGS. 2A to 2E, and use of a constant contact pressure for all the pads. By this, uniform and smooth polishing of the window surface, which is impossible with conventional rotation type polishing, swing type polishing (just like wall plastering) and oscillation type polishing methods, can automatically be achieved easily by one or a small number of operators from the outside of an airplane, without involving the aforementioned troublesome, time-consuming work such as removal of window frames.

A second advantage is to distribute polishing and cleaning liquids uniformly between the polishing pad and the window surface through use of a petal-shaped pad which is supplied with the liquids from its central opening. This provides excellent lubrication and efficient suppression of heat generation between the polishing pad and the window surface, and hence permits an increase in the number of revolutions of the polishing pad, providing for enhancement of the polishing efficiency and affording a substantial reduction of the polishing time. Consequently, polishing costs of window surfaces can be markedly cut.

Next, the present invention will be described concretely in connection with an embodiment.

In FIG. 3 showing a mounting device I, reference numeral 1 indicates a square mounting frame, 2 handles and 3 a square plate for positioning use, which has a centrally-disposed opening 3a of a size slightly larger than a window frame a and is fixed to the back of the square mounting frame 1. Reference numeral 4 designates vacuum sticking pads, which are provided at four corners on the back of the square mounting frame 1 and stick fast to the surface of the airplane body by suction force produced when urged against it, or by suction with vacuum pumps (not shown), thereby fixing the square mounting frame 1 to the surface of the airplane body. Reference numeral 5 designates holes, which receive support projections 6b of a polishing device II described later and are made in the square mounting frame 1 at its four corners in correspondence to the positions of the support projections 6b. For example, as shown in FIG. 4, a locking lever 5b, which is adapted to be projected by a spring 5a into each hole 5, engages a recess $6b_1$ of the support projection 6b inserted into the hole 5, locking the polishing device II. The polishing device can be unlocked by pulling back the locking lever 5b.

Figure 7A:
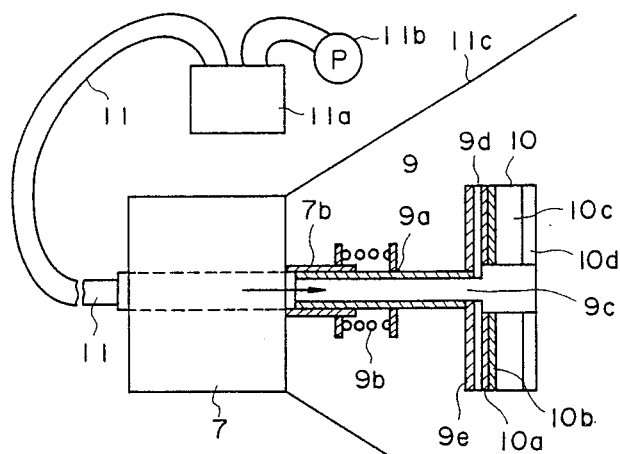
FIGS. 7A, 7B and 7C are a perspective and a sectional view of a polishing pad and a polishing head.
Figure 7C:
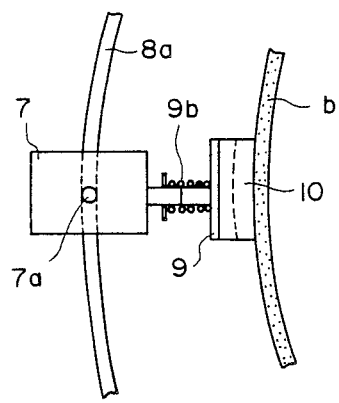
Figure 7B:
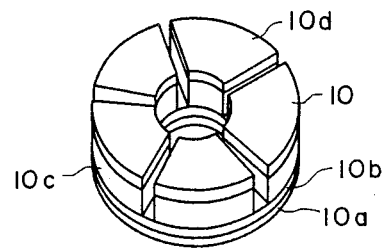

In FIG. 5 which shows the polishing device II, reference numeral 6 indicates upper and lower support members coupled by right and left handle bars 6a and each provided with the support projection 6b which is inserted into the hole 5 of the mounting device I for locking thereto the polishing device. Reference numeral 7 designates a motor for driving a polishing head and 8 a square frame-like motor support plate. The motor support plate 8 is received at its opposite end portions, through bearings, in straight X-axis guide grooves 6c cut in the inner surfaces of the upper and lower support members 6 and is driven laterally by a reversible motor (not shown) fixed on a lower support plate 6d through a rack which engages with a screw shaft driven by the motor and fixed on the support plate 8. In the opposite inner frames of the motor support plate 8 there are provided Y-axis guide grooves 8a which conforms to the curvature of the window surface b smaller than the curvatures of window surfaces to be polished. Support bars 7a of the motor 7 are movably supported in the guide grooves 8a. Thus, the motor 7 is movable in the Y-axis direction, i.e. in the vertical direction by the reversible motor (not shown) fixed on the support plate 8 through the screw shaft, which is driven by the reversible motor, and a rack which is fixed on the side of the motor 7 and engages with the screw shaft. Further, provision is made for obtaining a substantially constant contact pressure by the aide of a spring 9b and an elastic material 10c of a polishing pad 10 regardless of the curvature of the window surface to be polished. Reference numeral 9 designates a polishing head. As shown in FIG. 7A, the polishing head 9 comprises a hollow coupling shaft 9a which is slidably received on the rotary shaft 7a of the motor 7 and pressed by a spring 9b toward the window surface, and a polishing pad mounting base 9e which is coaxial with the hollow coupling shaft 9a and whose central opening 9c communicates therewith. The surface of the polishing pad mounting base 9e has pasted thereto magic cloth 9d (known as a Trademark of "magic tape") for detachably receiving a polishing pad. In FIGS. 7A, 7B and 7C, reference numeral 10 designates a polishing pad, which is composed of magic cloth 10a, an aluminum support disc 10b laminated thereon and having a centrally-disposed opening, and spaced-apart pad members 10d laminated on the aluminum disc 10b with buffer elastic material 10c sandwitched therebetween, an opening coaxial with that of the aluminum disc 10b being defined by the pad members 10d centrally thereof, as shown in FIG. 7B. When the polishing device II is mounted on the mounting device I with the polishing pad detachably and coaxially mounted on the mounting base 9e by means of the magic cloth 9d and 10a as shown in FIG. 7A, the polishing pad 10 is urged by the spring 9b against the window surface b with a substantially constant pressure even during movement on the window surface. Moreover, water, water mixed with antifreezing liquid during the winter season, water mixed with a detergent, water mixed with an abrasive, and other required liquids are supplied by a pump 11b from a liquid tank 11a to the hollow coupling shaft 9a through a flexible pipe 11 and are distributed uniformly all over the window surface to be polished, through the central opening of the polishing pad 10 and the petal-shaped pad members. Turning back to FIG. 5, reference numeral 12 designates a polishing pad exchanging and housing holder, which has pockets 12a, 12b and 12c provided side by side within the range, in which the polishing pad 10 carried by the motor 7 can move in the X-axis direction, for housing three rough, medium and finish polishing pads $10_1$, $10_2$ and $10_3$ as depicted in FIG. 8A. The housing holder is provided at the lower end portion of the back of the square motor support plate 8 in parallel thereto. For example, after completion of rough polishing, the motor 7 and consequently the polishing pad mounting base 9e is lowered with the coupling portion between the magic cloth 9d of the base 9 and the magic cloth 10b of the polishing pad 10 held against, for instance, a front panel $12a_1$ of the pocket 12a as shown in FIG. 8B, thereby removing the rough polishing pad 10a from the base 9 and letting it fall into the pocket 12a. The base 9 is then brought to the position of the pocket 12b, for example, and lowered thereinto, thereby supporting the medium polishing pad 10b on the base 9. In this manner, the polishing pads are selectively used according to the kind of polishing.

In FIG. 5, reference numeral 13 designates a driving control circuit box, in which there are housed a sequence control circuit and a start/stop push button switch 14 and so forth. The sequence control circuit is connected via cables to the motor of the polishing device and other required sections to send thereto command signals for performing in a predetermined sequence the driving of the pump for supplying a required liquid such as water to the polishing pad, the driving of the polishing pad rotating motor, the exchange of the polishing pad, and the driving of the X- and Y-axis direction moving motors for obtaining the locus of movement of each polishing pad described previously with regard to FIGS. 2A to 2E and the range of polishing described previously with respect to FIGS. 1A and 1B.

The operations of the embodiment are as follows:

(1) The square frame 1 of the mounting device I is mounted on the surface of the airplane body through the suction pads 4 so that the opening of the positioning square plate 3 is aligned with the window frame a.

(2) After this, the polishing device II with the handle bars 6a gripped by hands is attached to the mounting device I with the support projections 6b inserted into the holes 5 of the mounting device I, as shown in FIG. 9.

(3) Then, the switch 14 is turned ON, by which the rough polishing pad $10_1$ is mounted on the base 9 and driven for polishing in the manner described previously in conjunction with FIGS. 1A and 1B and FIGS. 2A to 2B, and then it is replaced by the medium polishing pad $10_2$ for medium polishing. Following this, the medium polishing pad $10_2$ is replaced by the finish polishing pad $10_3$ for finish polishing and a cleaning liquid is supplied to the pad $10_3$ for cleaning the polished window surface.

(4) After polishing, the polishing device II and the mounting device I are taken down from the airplane body by reversing the procedure mentioned above.

The present invention has been described above in connection with a particular embodiment, but the mounting device I and the polishing device II may also be formed as a unitary structure and the drive control circuit box 13 may also be attached thereto. A liquid shielding apron 11c may also be provided to prevent the polishing and cleaning liquids from splashing about as shown in FIG. 7A. It is also possible to effect substantially automatic or semi-manual control by providing a work command switch for each step. Although in the above the polishing pad is used both for polishing and for cleaning, a cleaning pad may also be provided separately. In such an instance, the number of pockets of the pad holder 12 is four.

As described above, according to the present invention, uniform and smooth polishing of airplane windows can be achieved by peculiar movement of the polishing pads along U-shaped loci, without damaging window frames from the outside of the airplane body, simply by mounting thereon the polishing device. Furthermore, liquids for polishing and cleaning are distributed uniformly throughout each polishing pad to provide a good lubrication and effective suppression of heat generation on the window surface being polished, so that efficient polishing can be achieved, producing an effect of substantially reducing the polishing time. Accordingly, as compared with the conventional method in which window frames are taken down from the inside of the airplane and windows are removed and then polished one by one through handwork, a plurality of windows can be polished by one or a small number of operators without any skill. Thus, the present invention overcomes the defects of the conventional method and markedly cuts the polishing costs as a whole.

What we claim is:

1. An airplane window polishing device, characterized by the provision of: rotating polishing means having a polishing pad for polishing a window surface of an airplane; means for supplying polishing and cleaning liquids to the rotating polishing means; means for urging the polishing pad of the rotating polishing means against the window surface to be polished; means for moving the rotating polishing means in X- and Y-axis directions on a plane perpendicular to the rotation axis of the rotating polishing means while rotating it; means for defining a frame detachably mounted on an outer surface of the airplane for detachably mounting the rotating polishing means opposite to the window surface at the outside of an airplane body for detachably mounting thereon the rotating polishing means within said frame.

2. An airplane window polishing device according to claim 1, characterized in that the said polishing pad is composed of a plurality petal-shaped unit pads spaced apart, jointly defining an opening centrally thereof.

3. An airplane window polishing device according to claim 1, characterized in that the polishing pad has a hollow support shaft communicating with the polishing pad for supplying thereto the polishing and cleaning liquids.

4. An airplane window polishing device according to claim 1, characterized in that said rotating polishing means comprises a plurality of polishing pads in correspondence to a number of required polishing steps.

5. An airplane window polishing device according to claim 1, characterized in that the rotating polishing means comprises a plurality of polishing pads adapted so that an area of its polishing is gradually enlarged toward the window frame in the X- and Y-axis directions as the surface roughness is smoothened by switching the polishing pads.

6. An airplane window polishing device according to claim 1, characterized in that the rotating polishing means moves along U-shaped loci for providing a U-shaped movement in the X- and Y-axis directions and a pitch of its U-shaped movement is within a radius of the polishing pad.

7. An airplane window polishing device according to claim 1, characterized in that the last-mentioned means comprises a positioning square plate having therein a positioning opening of a size a little larger than a window frame to be polished at a portion against which said rotating polishing means abuts.

8. An airplane window polishing device, characterized by the provision of: rotating polishing means having a polishing pad for polishing a window surface of an airplane; means for supplying polishing and cleaning liquids to the rotating polishing means; means for urging the polishing pad of the rotating polishing means against the window surface to be polished; means for moving the rotating polishing means in X- and Y-axis directions on a plane perpendicular to the rotation axis of the rotating polishing means while rotating it; means for positioning the rotating polishing means on the window surface at the outside of an airplane body and for detachably mounting thereon the rotating polishing means, said rotating polishing means comprising a motor having a rotary shaft, a hollow coupling shaft slidably received on the rotary shaft, a spring coupled to the rotary shaft and the hollow coupling shaft to press the hollow coupling shaft toward the window surface being polished, and a mounting base of the polishing pad engaged with the hollow coupling shaft.

* * * * *